United States Patent [19]

McFarland

[11] Patent Number: 5,627,954
[45] Date of Patent: May 6, 1997

[54] SYSTEMS AND METHODS FOR POSITIONING A DRAWER TITLE BAR ON A GRAPHICAL USER INTERFACE

[75] Inventor: Max McFarland, Cupertino, Calif.

[73] Assignee: Apple Computer, Inc., Cupertino, Calif.

[21] Appl. No.: 435,376

[22] Filed: May 5, 1995

[51] Int. Cl.[6] .................................................... G06T 3/00
[52] U.S. Cl. ........................... 395/139; 395/326; 395/340; 395/349
[58] Field of Search ...................................... 395/139, 138, 395/135, 134, 133, 141, 144–149, 155, 157, 161, 156, 158, 159, 160, 150, 151

[56] References Cited

U.S. PATENT DOCUMENTS

| | | | |
|---|---|---|---|
| 5,001,697 | 3/1991 | Torres | 395/139 |
| 5,305,435 | 4/1994 | Bronson | 395/159 |
| 5,450,538 | 9/1995 | Glaser et al. | 395/155 X |

FOREIGN PATENT DOCUMENTS

| | | |
|---|---|---|
| 0443357 | 8/1991 | European Pat. Off. . |
| WO9429793 | 12/1994 | WIPO . |

Primary Examiner—Almis R. Jankus
Attorney, Agent, or Firm—Burns, Doane, Swecker & Mathis, L.L.P.

[57] ABSTRACT

Systems and methods provide a user with increased flexibility and control over the appearance of objects on a user interface. Drawer objects can be created in at least two different ways. A graphical user interface can automatically place and size an extended portion of a drawer title bar when an active window is selected for conversion into a drawer. Alternatively, a user can drag a window toward an edge of a display space where a drawer will be created. Sizing and placement of the extended portion of the drawer title bar is accomplished according to various rules described herein.

13 Claims, 6 Drawing Sheets

FIG_1

FIG_2

FIG_3

FIG_4a

FIG_4b

FIG_5

FIG_6a

FIG_6b

FIG_7

FIG_8

SYSTEMS AND METHODS FOR POSITIONING A DRAWER TITLE BAR ON A GRAPHICAL USER INTERFACE

BACKGROUND

The present invention relates generally to graphical user interfaces for computer systems. More particularly, the present invention relates to methods and systems for placing and sizing title bars on graphical user interfaces.

The evolution of the computer industry is arguably unparalleled in its rate of growth and complexity. Personal computers, for example, which began as little more than feeble calculators with limited memory, tape-driven input and monochrome displays are now able to tackle almost any data processing task. While this meteoric increase in power was almost sufficient to satisfy the demand of application programmers and end users alike, the corresponding increase in complexity created an ease-of-use problem which the industry was some, what slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

Figure 1:
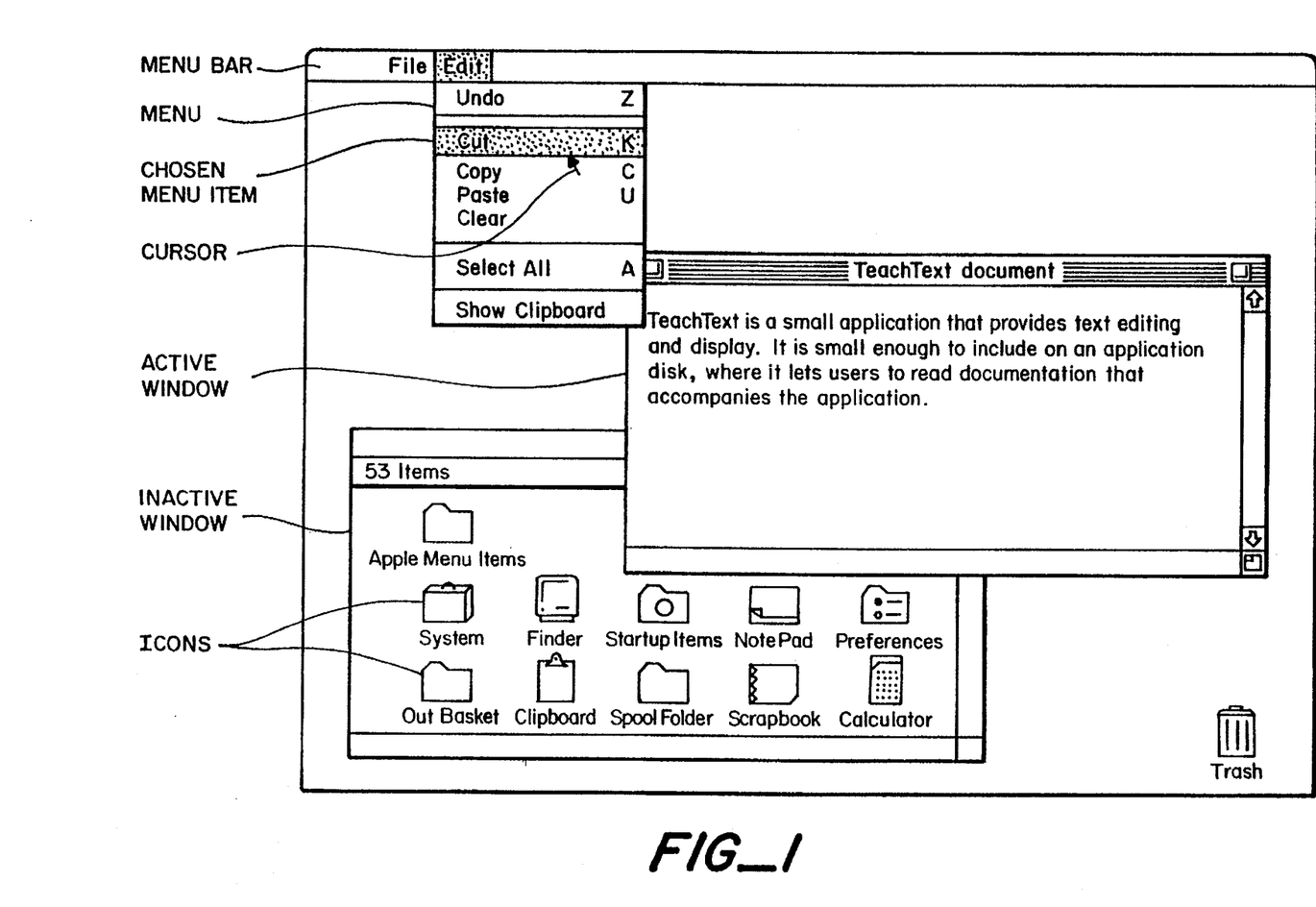
FIG. 1 shows a conventional desktop screen.

One type of GUI is based on a visual metaphor which uses a monitor screen as a work surface called a "desktop" where documents are presented in relocatable regions termed "windows". The user interacts with the computer by, for example, moving objects on the desktop, choosing commands from menus, and manipulating window controls, such as checkboxes and scroll bars. An exemplary desktop screen is reproduced as FIG. 1.

The success of this type of interface is evident from the number of companies which have emulated the desktop environment. Even successful concepts, however, must continually be improved in order to keep pace with the rapid growth in this industry. The advent of multimedia, especially CD-ROM devices, has provided vast quantities of secondary storage which have been used to provide video capabilities, e.g., live animation and video clips, as regular components of application displays. With these new resources at their disposal, application designers, and others, desire more and more control over the appearance of the display, including the desktop environment and, in particular, objects on the desktop.

Windows, filing cabinets, folders and documents are several examples of conventional desktop objects. As a further extension of the desktop visual metaphor, a new desktop object called a "drawer" has been introduced, an example of which is shown in FIG. 2. The drawer 8 shown in FIG. 2 is depicted in its opened state wherein the window extends from an edge 10 of the display space. Note that drawer 8 has a title bar 12. In its closed state, the drawer 8 might appear as illustrated in FIG. 3. Therein, note that the title bar 12 appears above the display space edge 10 while the rest of the drawer 8 is hidden from view. As a user creates and closes multiple drawers, many issues arise as to how, for example, the title bars 12 are to be drawn along the display space edge 10.

SUMMARY

These and other concerns and issues regarding the placement, sizing and drawing of drawer objects on a display are resolved according to exemplary embodiments of the present invention. For example, according to an exemplary embodiment of the present invention, a user can create a drawer at an edge of a display space by dragging an object to a desired location using a pointing device. Graphical user interfaces according to the present invention determine if, where and how to draw a title bar based upon the desired location relative to the placement of existing drawers along that edge of the display splice.

According to other exemplary embodiments, drawers can be created and title bars placed on an edge of a display space without the provision of position information by a user. Graphical user interfaces according to these exemplary embodiments first attempt to place a full length title bar along the edge of the display space. If no full length spaces are available between title bars of already existing drawers, then a compressed version of the title bar can be drawn in a largest available space.

BRIEF DESCRIPTION OF THE DRAWINGS

The foregoing, and other, objects, features and advantages of the present invention will be more readily understood by those skilled in the art upon reading the following detailed description in conjunction with the drawings in which:

FIG. 2 illustrates an exemplary drawer object in its opened state;

FIG. 3 illustrates the drawer object of FIG. 2 in its closed state;

FIG. 5 depicts dragging a window toward an edge of a display space to place the window as a drawer;

FIGS. 6(a) and 6(b) are used to describe placement of a title bar of a drawer between two existing title bars;

FIG. 7 is a flowchart describing a technique for positioning a drawer title bar according to an exemplary embodiment of the present invention; and FIG. 8 is a flowchart illustrating another technique for positioning a drawer title bar according to another exemplary embodiment of the present invention.

DETAILED DESCRIPTION

Exemplary embodiments of the present invention will be described in terms of various visual aspects created or drawn in a display space controlled by a graphical user interface. Those skilled in the art will appreciate that such an interface can, for example, be used in conjunction with a computer such as that illustrated in FIG. 4(a). Therein, a personal computer is illustrated as having a box 16 which contains, among other elements, circuit boards associated with the computer's functions, a keyboard 18, a pointing device 20 and a monitor 22 having a display space 24. The circuit boards included in box 16 can include boards which accommodate functional units such as those illustrated by the block diagram of FIG. 4(b). Therein RAM 30, ROM 32, processor 34, and I/O 36 are all interconnected via system bus 38.

Figure 4A:
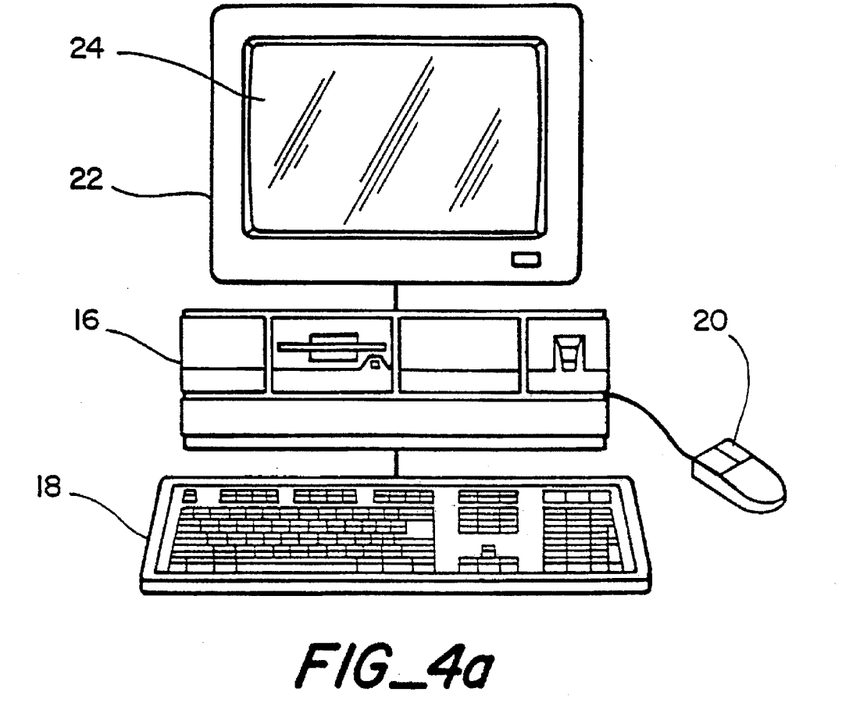
FIG. 4(a) illustrates an exemplary computer system which can be used to implement the present invention.
Figure 4B:
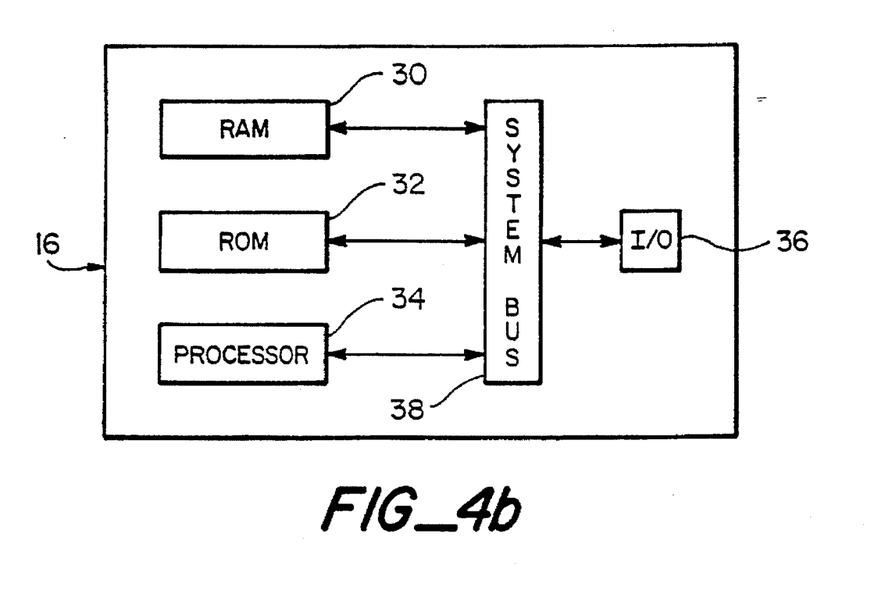
FIG. 4(b) is a block diagram illustrating various exemplary functional units of the computer system of FIG. 4(a)

Of course the personal computer illustrated in FIG. 4(a) is simply an example of one type of computer system in which graphical user interfaces according to the present invention may be implemented. For example, although the display space 24 of the system depicted in FIG. 4(a) consists of that provided by monitor 22, those skilled in the art will recognize that additional display devices could be arranged proximate monitor 22 to create a display space bridging several monitors.

Returning now to the discussion of drawer objects, according to exemplary embodiments of the present invention a drawer can be created and drawn in a display space in one of two ways. The first technique is initiated by dragging a window object to an edge of a display space at which a drawer can legally be created in its closed state. For example, in the display space 24 of the system shown in FIG. 4(a), the bottom edge and both side edges may be available for drawer creation with the top edge being reserved for a status for menu bar. If a second monitor was disposed to the right of monitor 22 and configured to become part of the display space for personal computer 16, then the right edge of display 24 might no longer be a valid area for the creation of a drawer.

In any event, as a user drags a window toward an edge of a display space, the outline of that window changes to become the outline of a drawer when the pointer reaches a position within a certain number of pixels of that edge. This is illustrated in FIG. 5 where window 26 is dragged down to the cursor position (indicated by the arrow) to become outline 27. Therein, the shaded region 28 graphically represents the region within which the graphical user interface will interpret a completed drag to be a request to transform window 26 into a drawer object. The number of pixels can be selected to be equal to the height of title bar 12, for example, 23 pixels from the display space edge 10. A drawer will be created if the drag ends while the drawer outline is still seen on the display, e.g., if the user releases the pointer while in the shaded region of FIG. 5. The operation of graphical user interfaces according to this exemplary embodiment of the present invention can handle a variety of cases which may be presented when the user drags and releases a window in the active region proximate the edge of a display space.

For example, a drawer is not created if the pointer is disposed over a title bar 12 of an existing drawer when the pointer is released. If this occurs, the user can be alerted that no drawer can be created at the desired location and the window which was dragged toward the edge of the display space will return to its original, pre-drag position.

In addition to not allowing the placement of drawers on top of one another, exemplary embodiments of the present invention handle drawer placement differently depending on the size of the space in which the user wishes to place a drawer. For example, the space may be too small for a drawer, may be large enough for a drawer but not large enough for a full length title bar 12, or may be large enough for both a drawer and for a full length title bar 12. Each of these cases will be described below with reference to FIGS. 6(a) and 6(b).

FIG. 6(a) shows the case where a user has dragged a window to the position indicated by the dotted outline of the title bar 30 and the cursor arrow 32. Note that the space chosen by the user for placement of the drawer, i.e., that having dimension 'x', is smaller than the full length 't' of the title bar 30. If 'x' is less than some predetermined threshold, for example 27 pixels, the outline 30 zooms back to the original, pre-drag window location and no drawer is created in much the same way as if the user had placed the cursor 32 directly over a title bar of an existing drawer on display space edge 10. The measurements of open spaces between existing drawer title bars (or between an existing drawer title bar and an end of the display) can be performed using stored coordinate values which identify the position of existing title bar objects on an edge of a display. For example, a data structure can be created which stores coordinates identifying positions of the left and/or right corners of existing title bar objects. Coordinates of adjacent title bar objects can be used in various ways apparent to those skilled in the art to arrive at the dimension 'x' of any open space on an edge of a display.

In this case, however, suppose that dimension 'x' is greater than whatever predetermined threshold has been selected, but still less than the length necessary to place the full length 't' of the title bar 30 in the space selected by the user. Exemplary interfaces according to the present invention will center the title bar 30 in the space selected by the user and compress it to fit within the space pointed to by the cursor 32 having dimension 'x'. For example, the title bar 30 may be compressed to a size which is 'x' minus four pixels in length leaving a two pixel gap to either side of the compressed title bar 30 drawn on the display. The gaps provide a visual separation of adjacent title bars. This case is depicted in FIG. 6(b) where the title bar 34 actually drawn on the display at edge 10 is a compressed version of the outline 30 in FIG. 6(a) from which it originated.

A third situation, not illustrated in the Figures, occurs when the dimension 'x' of the space selected by the user is sufficient to draw the entire title bar 30. In such a case, the full length title bar will then be drawn either (1) centered about the cursor position or, if a centered version, of the title bar would overlap with existing title bars, then (2) drawing an edge of the title bar 30 proximate a nearest existing title bar. For example, in FIG. 6(a), assuming now that the dimension 'x' was sufficient to draw a full length title bar 30, then that title bar would be drawn by the graphical user interface to appear with a left edge proximate the right edge of the "Clippings" drawer since the cursor 32 was released closer to this drawer than the "App Aliases" drawer.

Having described various principles for title bar placement and drawing according to an exemplary embodiment of the present invention, these principles will now be brought together in the exemplary method described in the flowchart of FIG. 7. First, at block 40, a determination is made as to which physical device is handling the display space location at which the user has indicated a desired placement of a drawer. Of course, this step need not be performed for display spaces which are handled by only one device. Next, if there are existing drawers drawn on this device, the first drawer to the left of the cursor's location is identified at step 42. Then the process goes through a series of decision steps in order to determine if the cursor has been placed at a location at which creation of a drawer is permissible. For example, at block 44 the length of the space pointed to by the cursor is compared with a minimum length for drawing the title bar. If not, then the flow proceeds to block 46 where the outline of the drawer zooms back to its original window location. Otherwise, the process then checks to see if the cursor location is disposed on an existing title bar at decision block 48. If so, then the flow also proceeds to block 46 where the potential drawer zooms back to its original window location. Otherwise, the flow continues to block 50 wherein it is ascertained whether or not the cursor position is otherwise a legal position for drawer placement. For example, it may be desirable to not allow drawers to overlap between devices. Similarly, if multiple devices support the display space, then some edges of each device which normally would support drawer placement may not support drawers in a multiple device environment. If the region is appropriate for drawer placement, then the space indicated by the pointer is evaluated as described above with respect to FIG. 6(a) to determine if the drawer title bar needs to be compressed and/or simply shifted to the left or right of an existing title bar. The title bar is then drawn on the display at the appropriate length and centering.

According to another exemplary embodiment of the present invention, user indication of a preferred location for a drawer along an edge of a display space is not necessary. In this exemplary embodiment, the user indicates that an object, e.g., an open folder window, should be changed into a drawer object. This can be accomplished, for example, by using a menu command which turns an active window into a drawer. Since the user has not indicated a preferred location for the extended portion of the title bar of the drawer, this exemplary embodiment attempts to place the drawer at the first available location that is large enough to draw a full length version of the extended portion of the title bar starting at a bottom lefthand corner of the display space. The user interface examines each space between existing drawers (if any) from left to right until a space is found which is large enough to accept a full length extended portion of the title bar for the drawer to be created. During this traversal of the display space edge, each space which is less than a full length is measured and the location of the largest space less than a full length is stored. In this way, if the right corner of the device is reached without having identified a space which will accept a full length extended portion of the title bar, then the drawer is placed at the location of the stored largest space and the extended portion 14 is compressed as described above. These principles will now be described with respect to the flowchart of FIG. 8.

Beginning at the lefthand corner of the display device, the space between the corner of the device and the nearest existing title bar is measured at block 54. The flow then proceeds to block 56 wherein this measured space is compared with the full length of the title bar to be drawn. If the space is large enough to draw the full length title bar, then the flow proceeds to block 58 wherein the drawer is placed and the title bar portion appears on the display. For example, if there are no existing drawers on the display device, then the space X will be measured to be the length of the display device and the graphical user interface will draw the title bar at its full length beginning in the lefthand corner of the display device.

If, on the other hand, the space X is not large enough to draw a full length title bar, then the flow proceeds to block 60 wherein the length of the space X is compared with the largest space measured thus far. For the first iteration, the space X will inherently be the largest measured and thus the flow will move to block 62 where the identity of this space is stored as the largest measured space which is not sufficient to draw a full length title bar. For subsequent iterations (if any), however, the identity of this space will only be stored if it is larger than the currently stored, largest, measured space. Next, the flow will proceed to block 64 wherein it is determined whether the right end of the device has been reached. If so, then the process is unable to find a space which was sufficient to draw a full length title bar portion and, instead, draws a compressed portion of the drawer title bar at the largest space identified by the stored indicator at block 66. If the end of the device has not been reached the flow moves from block 64 to block 68 where the next available space is identified for processing and the flow branches back to block 54 for another iteration.

The present invention is described herein by way of exemplary, illustrative embodiments, some of which refer to graphical user interfaces implemented using the Macintosh® computer system as a reference for explaining the present invention. Those wishing additional information with respect to the Macintosh® system are referred to *Inside Macintosh*, Vols. 1–6. However, those skilled in the art will readily appreciate that systems and methods according to the present invention can be applied to any type of display system having a user interface. Further, while window objects are used to illustrate how exemplary embodiments of the present invention effect the placement, sizing and drawing of drawer objects and drawer title bars, those skilled in the art will recognize that the present invention can be used to control the appearance and of drawer objects created in any manner and from any type of container object. Those desiring more information on drawer objects generally are referred to U.S. patent application Ser. No. 08/090,470 entitled "Desk Drawer User Interface", filed on Jul. 12, 1993 and U.S. patent application Ser. No. 08/075,278 entitled "Computer System with Graphical User Interface Including Drawer-Like Windows", filed on Jun. 11, 1993, both of which disclosures are incorporated here by reference. Moreover, the principles of the present invention can be applied to any type of object being placed upon the edge of a display and is not limited to title bars, generally, or drawer title bars, specifically.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for drawing an object between existing objects on an edge of a display comprising the steps of:

determining if a space exists on said edge in which said object can be drawn on said edge at full length;

if so, drawing said object in said space at said full length;

otherwise, identifying a largest space between said existing objects;

compressing said object to fit into said largest space; and drawing said compressed object in said largest space.

2. The method of claim 1, wherein said object is a title bar of a drawer object.

3. The method of claim 1, further comprising the steps of:

determining if said largest space between existing objects is less than a predetermined threshold; and if so, indicating to a user that said object cannot be drawn on said edge of said display.

4. A method for drawing an object between existing objects on an edge of a display comprising the steps of:

measuring a length of an open space on said edge of said display;

comparing said measured length with a full length of said object;

drawing, if said measured length exceeds said full length, said object in said open space; and drawing, if said measured length is less than said full length, a compressed version of said object bar in said open space.

5. The method of claim 4, further comprising the steps of:

drawing said object centered about a cursor position unless a centered object bar would overlap with one of said existing objects; and shifting said object away from said centered position if said centered object would overlap with one of said existing objects.

6. The method of claim 4, wherein said object is a title bar of a drawer object.

7. The method of claim 4, further comprising the steps of:

determining if said measured space is less than a predetermined threshold; and if so, indicating to a user that said object cannot be drawn in said open space on said edge of said display.

8. The method of claim 4, further comprising the step of:

pointing, by a user, to said open space using a pointing device.

9. In a computer having a display, a system for drawing an object between existing objects on an edge of said display, comprising:

a data structure for storing position information of existing objects;

a graphical user interface for receiving and generating signals associated with said display, including a signal indicating that said object is to be drawn on said edge of said display; and a processor for receiving said signal and determining at least one of a location and a size of said object to be drawn on said edge of said display using said position information stored in said data structure, wherein at least one of said location and said size are transmitted to said graphical user interface which renders said object in accordance therewith.

10. The system of claim 9, further comprising:

a pointing device for generating a cursor signal to said graphical user interface which indicates a space on said edge of said display device in which said object is to be drawn and said graphical user interface generates said signal based upon said cursor signal;

wherein said processor determines that a dimension of said space is sufficient to render said object at a full size and said processor transmits coordinate information and an indication that said object is to be rendered at said full size to said graphical user interface.

11. The system of claim 9, further comprising:

a pointing device for generating a cursor signal to said graphical user interface which indicates a space on said edge of said display device in which said object is to be drawn and said graphical user interface generates said signal based upon said cursor signal;

wherein said processor determines that a dimension of said space is sufficient to render said object at a compressed size and said processor transmits coordinate information and an indication that said object is to be rendered at said compressed size to said graphical user interface.

12. The system of claim 9, further comprising:

a pointing device for generating a cursor signal to said graphical user interface which indicates a space on said edge of said display device in which said object is to be drawn and said graphical user interface generates said signal based upon said cursor signal;

wherein said processor determines that a dimension of said space is insufficient to render said object in said space and said processor transmits an indication that said object cannot be rendered in said space to said graphical user interface.

13. The system of claim 9, wherein said graphical user interface further comprises:

an interface portion which can be actuated by a user to generate said signal which also identifies an active object that is to be redrawn as said object;

wherein said processor identifies said location for said object on said edge of said display and said size for said object based upon said signal and said position information stored in said data structure.

* * * * *